(12) United States Patent
Harrold

(10) Patent No.: US 6,758,620 B1
(45) Date of Patent: Jul. 6, 2004

(54) METERED DOSE DISPENSER DABBER DEVICE

(75) Inventor: John E. Harrold, Bloomsbury, NJ (US)

(73) Assignee: Valley Design, Inc., Bloomsbury, NJ (US)

( * ) Notice: Subject to any disclaimer, the term of this patent is extended or adjusted under 35 U.S.C. 154(b) by 0 days.

(21) Appl. No.: 10/640,429

(22) Filed: Aug. 13, 2003

(51) Int. Cl.[7] .......................... A47L 13/30; B43M 11/06
(52) U.S. Cl. .................. 401/264; 401/263; 401/266; 401/183; 401/186; 401/205; 222/205; 222/451
(58) Field of Search ................ 401/205, 261, 401/263, 264, 265, 266, 183–186; 222/205, 212, 450, 451, 454

(56) References Cited

U.S. PATENT DOCUMENTS

| | | | | |
|---|---|---|---|---|
| 2,701,163 A | * | 2/1955 | Kedzie et al. | 222/402.2 |
| 2,859,900 A | * | 11/1958 | Kiyuna | 222/424 |
| 3,663,113 A | | 5/1972 | Frain et al. | |
| 4,541,552 A | | 9/1985 | Scheithauer | |
| 4,582,230 A | * | 4/1986 | Vierkotter | 222/442 |
| 4,779,767 A | * | 10/1988 | Griffiths | 222/205 |
| 4,946,075 A | * | 8/1990 | Lundback | 222/181.3 |
| 5,199,808 A | | 4/1993 | Gueret | |
| 5,568,990 A | | 10/1996 | McAuley | |
| 5,899,624 A | | 5/1999 | Thompson | |

* cited by examiner

Primary Examiner—David Walczak
(74) Attorney, Agent, or Firm—Kenneth P. Glynn

(57) ABSTRACT

A metered dose dispensing dabber device includes a dabber main housing having a container attachment for affixing the device to a container, a metered dosage reservoir, a hollow dip tube, a metered dosage reservoir outlet, and a valve. The main housing has a base divider wall, this base divider wall having an underside and top side. Further, the base divider wail is closed to prevent liquid from passing from the underside to the top side. The metered dosage reservoir has enclosed walls and is located above the top side of the divider wall. The hollow dip tube passes through the base divider wall and extends downwardly therefrom for insertion into a container. The dip tube also extends upwardly to a predetermined height in the metered dosage reservoir to establish a fill level. The metered dosage reservoir outlet is located on a metered dosage reservoir wall opposite the dip tube. The valve is located in the reservoir outlet, in proximity to the dip tube. The valve has a first position wherein the reservoir outlet is closed and the dip tube is open, and has a second position wherein the reservoir outlet is open and the dip tube is closed. The device is attached to a container. A user squeezes a container to fill the reservoir to the dip tube height, inverts and presses to release (dab) the metered dosage.

20 Claims, 3 Drawing Sheets

METERED DOSE DISPENSER DABBER DEVICE

BACKGROUND OF THE INVENTION

1. Field of the Invention

The present invention relates to dabber devices, and, more particularly to such devices that will apply a predetermined amount of fluid for each dab (application). Hence, the present invention pertains to metered dosage applicators that may be used to limit the amount of fluid dispensed, or control it so that a specific required amount is dispensed, as in the case of fixed dosage, externally applied medication. Thus, while the present invention device is particularly useful is medication delivery, it could also be used for no-medicinal purposes, e.g. moisturizing labels or applying degreaser to a chemical etching, as in delicate, intricate electronics work. However, the present invention is most advantageous for applying a prescribed dosage to a surface, e.g., skin, by dabbing (pressing an applicator).

2. Information Disclosure Statement

The following patents are representative of applicator devices:

U.S. Pat. No. 3,663,113 describes a fluid applicator assembly including a retainer ring adapted to be snugly fitted within the open end of a container, the ring having at one end an inwardly extending peripheral web member having value opening therein, a cover means secured to the forward end of the retainer, a value stem extending through the value opening and having an abutment at one end lying against a cover means for the assembly and a valve head at its other end lying against the underside of the web, and a coil spring urging the valve stem in a forward direction, the wall of the web opening being inclined forwardly so as to define a value seat and the wall of the web opening being further inclined inwardly so as to permit easy snap-in insertion of the value stem through the opening.

U.S. Pat. No. 4,541,552 describes a device for metering and dispensing liquid or semiliquid mediums, such as adhesives, paints, lacquers, oils, and anaerobic plastics, comprising a tube having a discharge port and a first valve seat with a conical taper thereto inside of the tube adjacent the discharge port, and a valve body slideable within the tube between open and closed positions with the first valve seal. The valve body has a conical tapered end portion, which complements the conical taper of the first valve seat of the tube. At least one spring nominally biases the valve body to closed position against the first valve seat and a tip is formed on the end of the valve body, which extends through the discharge port of the tube and closes it when the valve body is in closed position against the first valve seat. A cylindrical inner wall of the tube connects with the conical taper of the first valve seat and further extends to form a flared storage chamber at the end thereof. The valve body has a cylindrical portion slideable within the cylindrical inner wall of the tube to form a second valve seat between the flared storage chamber and a metering chamber formed between the ends of the valve body with the cylindrical inner wall of the tube for the purpose of controlling the amount of medium dispensed during use of the device.

U.S. Pat. No. 5,199,808 describes applicator device comprising a receptacle, which is closed by a tearable cover, and a deformable applicator element, in which, between the applicator element and the cover, is a rounded body retained by a retaining device. Under the effect of pressure exerted on the applicator element, which is transmitted to the rounded body, said rounded body tears the cover and falls into the receptacle.

U.S. Pat. No. 5,568,990 describes a liquid applicator providing for a self-sealing feature, which applicator comprises a housing, a valve ember and a spring member. The housing has an aperture through its top wall and an annular sleeve projecting inwardly from an edge of the top wall in a surrounding relation with the aperture, the annular sleeve having an end portion. The valve member includes an actuating part that is slideable received by the annular sleeve and a sealing part that is shaped to form a releasable seal with the end portion of the annular sleeve. The valve and spring members are disposed in an axially displaceable relation such that the actuating part of the valve member is resiliently urged into the annular sleeve; that a part of the actuating part protrudes from the top wall of the housing; and that the sealing part of the valve member sealably engages with the end portion of the annular sleeve.

U.S. Pat. No. 5,899,624 describes a fluid dispensing valve used for printing and marking, having a valve body with an end wall which defines an aperture and a spring biased valve element disposed, within the valve body to open and close the aperture. A spring element is coupled to the tubular body adjacent the circular wall, the spring element and the wall defining a chamber for receiving a fluid metered through the aperture of the valve body when the aperture is opened, the spring element having at least one aperture communicating with the chamber. A porous member is affixed to the spring element such that the porous member covers the aperture in the spring element. The porous member transfers the fluid received in the chamber to a surface in the form of a printed geometric image. In operation, a printing force applied to the porous member causes the spring element to compress and engage the portion of the valve element thereby pushing a portion of the valve element partially back through the aperture in the open position to allow the passage of a marking fluid therethrough to the chamber to wet the porous member. The porous member has a predetermined rigidity, which substantially prevents the porous member from distorting from its predetermined geometric shape under the printing force. The fluid dispensing valve is typically affixed to the open end of a container that contains the fluid to be dispensed. A removable cap is provided for covering the valve when it is not being used.

Notwithstanding the prior art, the present invention is neither taught nor rendered obvious thereby.

SUMMARY OF THE INVENTION

The present invention relates to a metered dose dispensing dabber device. This device includes a dabber main housing having a container attachment means for affixing the device to a container, a metered dosage reservoir, a hollow dip tube, a metered dosage reservoir outlet, and a valve. The main housing has a base divider wall, this base divider wall having an underside and top side. Further, the base divider wall is closed to prevent liquid from passing from the underside to the top side. The metered dosage reservoir has enclosed walls and is located above the top side of the divider wall. The hollow dip tube passes through the base divider wall and extends downwardly therefrom for insertion into a container. The dip tube also extends upwardly to a predetermined height in the metered dosage reservoir to establish a fill level. The metered dosage reservoir outlet is located on a metered dosage reservoir wall opposite the dip tube. The valve is located in the reservoir outlet, in proximity to the dip tube. The valve has a first position wherein the reservoir outlet is closed and the dip tube is open, and has a second position wherein the reservoir outlet is open and the dip tube is closed.

Because ease of fabrication is an important factor in effectively producing the present invention metered dose dispensing dabber device, in some preferred embodiments, the dip tube and the base divider wall are a single unitary component of the device, and may be formed in a single mold.

In other preferred embodiments, the metered dose dispensing dabber device has enclosed walls of the metered dosage reservoir that include a top wall, wherein the reservoir outlet is located on this top wall. In some embodiments, the metered dose dispensing dabber device reservoir top wall is a domed top wall.

Also, in preferred embodiments of the present invention metered dose dispensing dabber device, the valve is connected to a flexible spring member such that the valve is movably connected to the outlet. Thus, for example, the metered dose dispensing dabber device flexible spring member may be connected to the top wall of the reservoir so as to move relative thereto. The flexible spring member may include a plurality of orifices thereon positioned for dispensing and dispersing of liquid exiting said reservoir outlet. Alternatively, the spring and a dispersing manifold may be separate from one another.

In some cases of the present invention, the spring member and/or separate dispersing manifold may be a domed spring member and/or manifold. The present invention metered dose dispensing dabber device may further include a dispersion means located in proximity to the metered dosage reservoir outlet. This could be a sponge, felt or porous pad adjacent the spring member when it also functions as a manifold (has dispersion orifices), or adjacent a manifold separate from the spring.

The present invention metered dose dispensing dabber device container attachment means may be a snap-on mechanism, a keyway mechanism, or a threaded attachment means.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
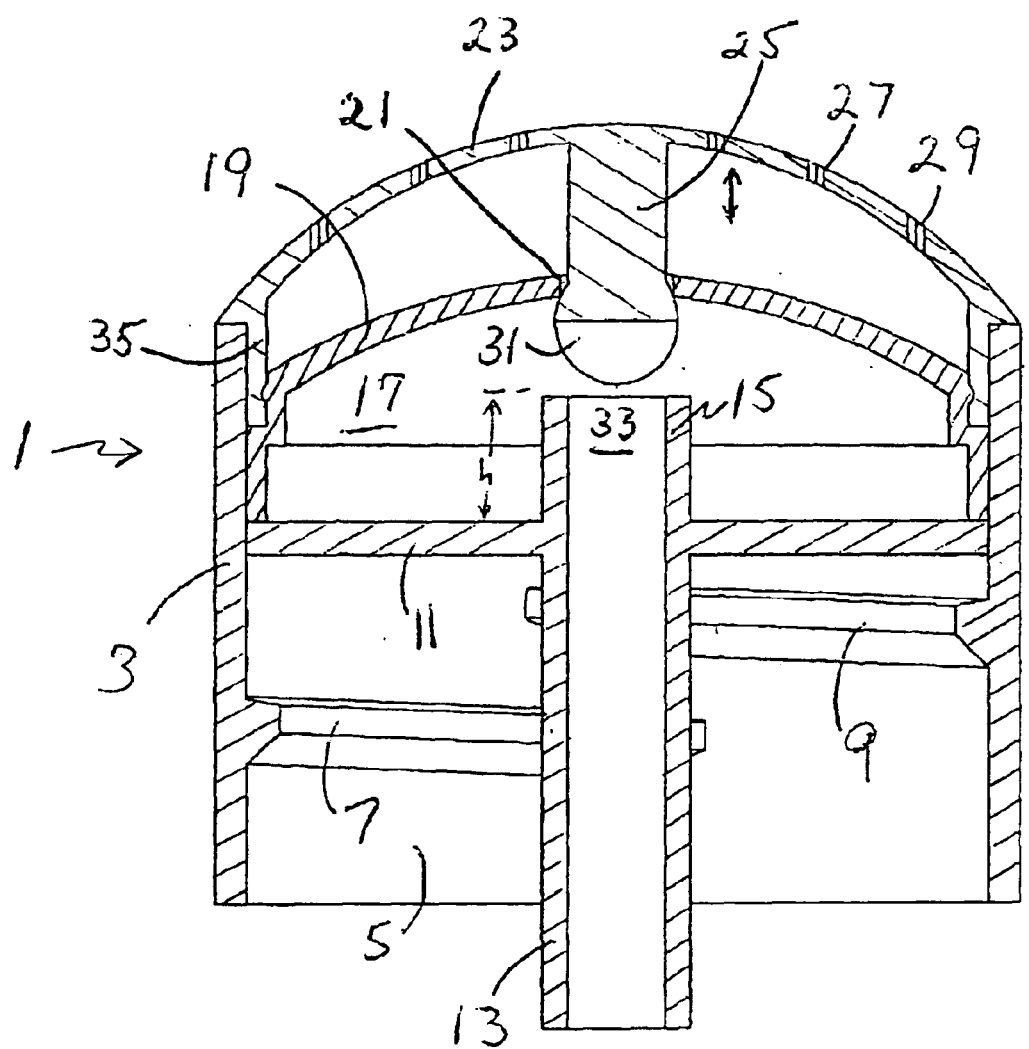
FIG. 1 illustrates a cut front view of one preferred embodiment of the present invention metered dose dispensing dabber device.

FIG. 1 illustrates a cut front view of one preferred embodiment of the present invention metered dose dispensing dabber device 1, which includes a dabber main housing 3, with container attachment means 7 and 9 (threading like the inside of a screw cap for attachment to a container with corresponding receiving threads) located on inside wall 5 of dabber main housing 3. Main housing 3 has a base (bottom) divider wall 11 with an underside that seals the container, and a top side that faces away from the container. This base divider wall 11 closes off the container contents (fluid) from external contact. Base divider wall 11 has a hollow dip tube 13 passing through it. In this case, they have conveniently been created unistructurally, i.e., from a single mold. Dip tube 13 has an upper end 15 that extends into metered dosage reservoir 17 to a predetermined height "h" to create a fill level and thereby establish a fixed dosage amount.

When present invention device 1 is attached to a container with a liquid content such as medication, and dip tube 13 extends downwardly to or close to the bottom of the container, a user may squeeze the container and liquid will fill reservoir 17, but the reservoir liquid content will drain back down until the liquid level is "h" because the set height of the dip tube prevents further drain back and a metered amount is set for dabbing.

Reservoir 17 is closed, except for an outlet 21 located on top domed wall 19, and the inlet opening 33 of dip tube 13. An optional small air hole could be included in wall 19 to eliminate minor or temporary vacuum. Valve 31 and its stem 25 are connected to spring member 23, as shown. In this embodiment, spring member 23 acts both as a spring for the valve and as a manifold, with dispersion orifices, such as orifices 27 and 29. Spring member 23 is flexible enough to flex in and out when pressed and released, with valve 31 traveling accordingly. Turn device 1 upside down and press; spring member 23 will move inwardly with valve 31 going from its rest position shown, wherein outlet 21 is closed and dip tube opening 33 is open, to its stressed position wherein outlet 21 is open and dip tube opening 33 is closed, permitting metered dosage content of reservoir 17 to be dispersed and applied by dabbing.

Figure 2:
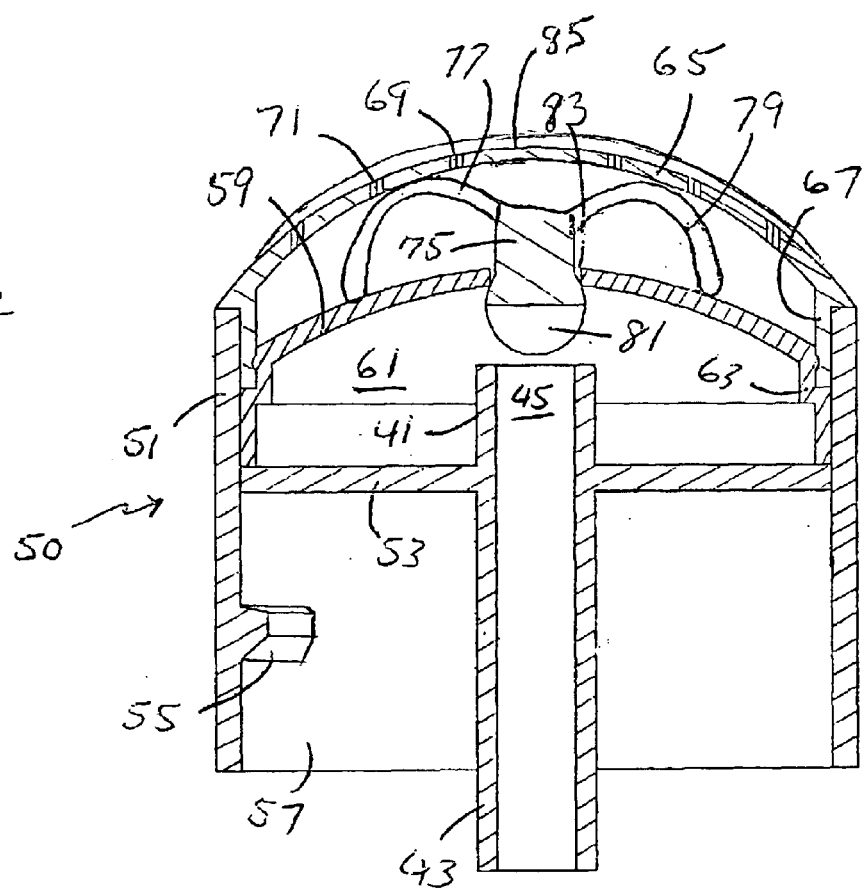
FIG. 2 illustrates a cut front view of another preferred embodiment of the present invention metered dose dispensing dabber device; and, FIG. 3 illustrates a cut front view of one preferred embodiment of the present invention metered dose dispensing dabber device system, including the container.

FIG. 2 illustrates a cut front view of another preferred embodiment of the present invention metered dose dispensing dabber device 50, which includes a dabber main housing 51, with container attachment means 55 (protrusion for snapping into a recess located on a neck of a container) located on inside wall 57 of dabber main housing 51. Main housing 51 has a base divider wall 53. Base divider wall 53 closes off the container contents and has a hollow dip tube 43 passing through it. Dip tube 43 has an upper end 41 that extends into metered dosage reservoir 17 to a predetermined height "h" to create a fill level and thereby establish a fixed dosage amount, as described in conjunction with FIG. 1 above.

When present invention device 50 is attached to a container with, for example, liquid medication, and dip tube 43 extends downwardly to approximately the bottom of the container, a user may squeeze the container and liquid will fill reservoir 61, and any overfill liquid content will drain back down until the liquid level is "h" as the set height of the dip tube prevents further drain back. Thus, a metered amount of fluid is set in the reservoir for subsequent dabbing.

Reservoir 61 is closed, except for an outlet 83 located on top, domed wall 59, and the inlet opening 45 of dip tube 43. An optional small air hole could be included in wall 59 to eliminate any vacuum. Valve 81 and its stem 75 are connected to spring members 77 and 79, as shown. In this embodiment, spring members 77 and 79 act as a spring for the valve and press against flexible manifold 65. Manifold 65 has dispersion orifices, such as orifices 69 and 71, and a dispersion means in the form of a sponge pad 85 to aid in even dabbing. Manifold 65 has rigid sidewall 67, attached to both the main housing 51 and the reservoir dome wall 59 to create efficient tightness and strength to support repeated dabbing. Manifold 65 is flexible enough to flex in and out when passed and released, with downward pressure on spring members 77 and 79 causing valve stem 75 and valve 81 to travel accordingly. Squeeze the container to load the reservoir as described above. Invert device 50 and press;

manifold 65, spring members 77 and 79 will move inwardly with valve 81 going from its rest position shown, wherein outlet 83 is closed and dip tube opening 45 is open, to its stressed position wherein outlet 83 is open and dip tube opening 45 is closed, permitting metered dosage content of reservoir 61 to be dispersed and applied by dabbing.

Figure 3:
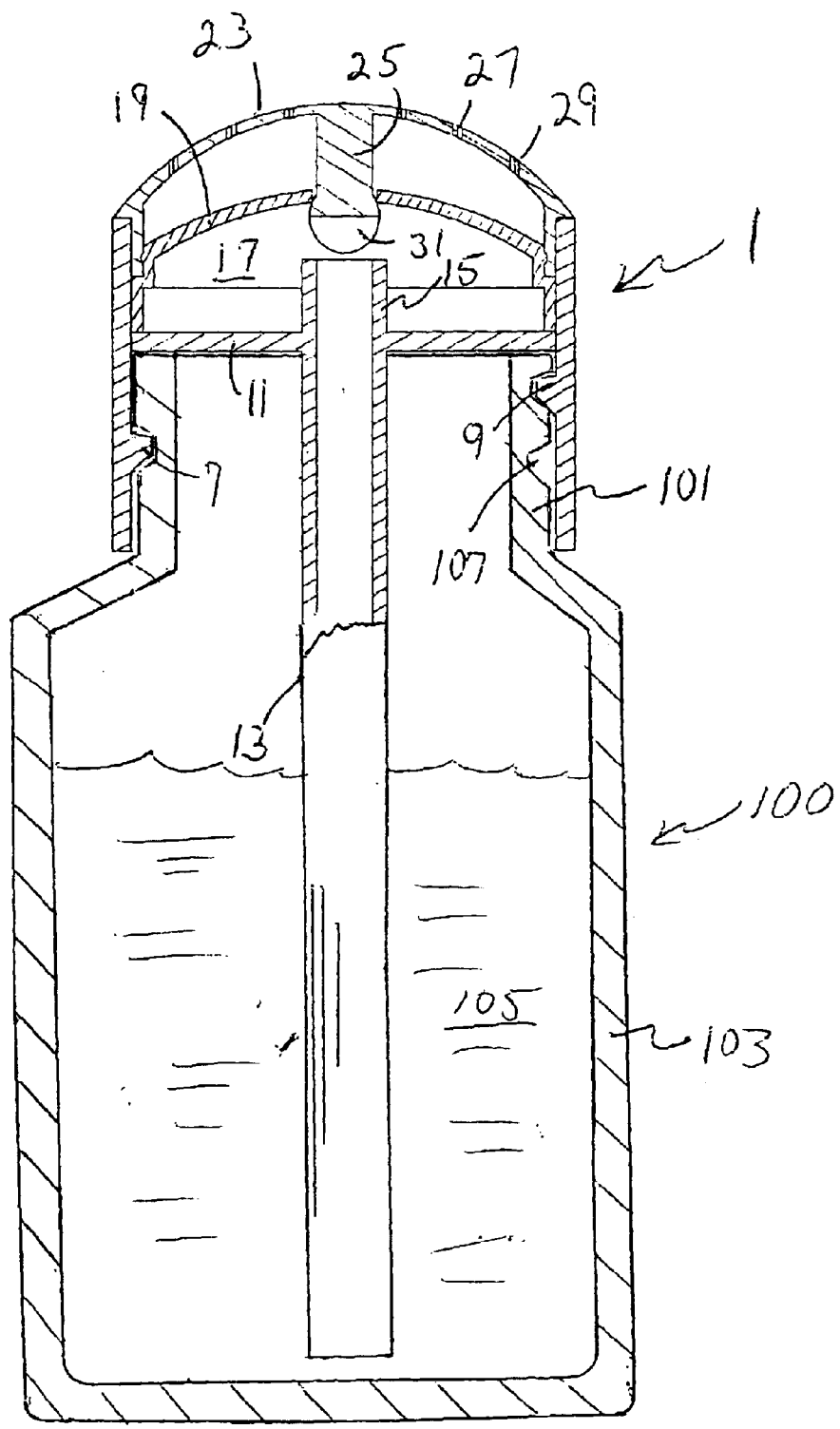

FIG. 3 illustrates a cut front view of one preferred embodiment of the present invention metered dose dispensing dabber device system, including the container. It includes the present invention device 1 from FIG. 1 above, along with container 100, as shown. Elements shown in FIG. 1 are identically numbered and need not be repeated here. Container 100 contains medicine 105 and includes body 103 and threaded neck 101 with threads 107 to fit snuggly with device threads 7 and 9, as shown. The system (device and container) is used as described above.

Obviously, numerous modifications and variations of the present invention are possible in light of the above teachings. For example, the container need not be cylindrical; it could be rectangular in cross section, as could the device itself. In this case, circular-required threading might not be an effective attachment mechanism, but a snap on or heat-welded connection would be efficient and effective. It is therefore understood that within the scope of the appended claims, the invention may be practiced otherwise than as specifically described herein.

What is claimed is:

1. A metered dose dispensing dabber device, which comprises:
   (a.) a dabber main housing having a container attachment means for affixing said device to a container, said main housing having a base divider wall, said base divider wall having an underside and top side, said base divider wall being closed to prevent liquid from passing from said underside to said top side;
   (b.) a metered dosage reservoir having enclosed walls and located above said top side of said divider wall;
   (c.) a hollow dip tube passing through said base divider wall and extending downwardly therefrom for insertion into a container, said dip tube also extending upwardly to a predetermined height in said metered dosage reservoir to establish a fill level;
   (d.) a metered dosage reservoir outlet located on a metered dosage reservoir wall opposite said dip tube; and,
   (e.) a valve located in said reservoir outlet, in proximity to said dip tube, said valve having a first position wherein said reservoir outlet is closed and said dip tube is open, and having second position wherein said reservoir outlet is open and said dip tube is closed.

2. The metered dose dispensing dabber device of claim 1 wherein said dip tube and said base divider wall are a single unitary component of said device.

3. The metered dose dispensing dabber device of claim 1 wherein said enclosed walls of said metered dosage reservoir include a top wall and said reservoir outlet is located on said top wall.

4. The metered dose dispensing dabber device of claim 3 wherein said top wall is a domed top wall.

5. The metered dose dispensing dabber device of claim 1 wherein said valve is connected to a flexible spring member such that said valve is movably connected to said outlet.

6. The meter dose dispensing dabber device of claim 5 wherein said flexible spring member is connected to said top wall of said reservoir so as to move relative thereto.

7. The metered dose dispensing dabber device of claim 6 wherein said flexible spring member includes a plurality of orifices there on positioned for dispensing and dispersing of liquid exiting said reservoir outlet.

8. The metered dose dispensing dabber device of claim 7 wherein said flexible spring member is domed spring member.

9. The metered dose dispensing dabber device of claim 5 wherein said flexible spring member includes a plurality of orifices thereon positioned for dispensing and-dispersing of liquid exiting said reservoir outlet.

10. The metered dose dispensing dabber device of claim 9 wherein said flexible spring member is a domed spring member.

11. The metered dose dispensing dabber device of claim 1 wherein said container attachment means is a threaded attachment means and said main housing is generally cylindrical in shape.

12. The metered dose dispensing dabber device of claim 1 wherein said device further includes a dispersion means located in proximity to said metered dosage reservoir outlet.

13. The metered dose dispensing dabber device of claim 12 wherein said dispersion means is a dispersion pad.

14. A metered dose dispensing dabber system, which comprises:
   (a.) a dabber main housing having a container attachment means for affixing said device to a container, said main housing having a base divider wall, said base divider wall having an underside and top side, said base divider wall being closed to prevent liquid from passing from said underside to said top side;
   (b) a metered dosage reservoir having enclosed walls and located above said top side of said divider wall;
   (c.) a hollow dip tube passing through said base divider wall and extending downwardly therefrom for insertion into a container, said dip tube also extending upwardly to a predetermined height in said metered dosage reservoir to establish a fill level;
   (d.) a metered dosage reservoir outlet located on a metered dosage reservoir wall opposite said dip tube;
   (e.) a valve located in said reservoir outlet, in proximity to said dip tube, said valve having a first position wherein said reservoir outlet is closed and said dip tube is open, and having second position wherein said reservoir outlet is open and said dip tube is closed: and
   (f.) a container having a neck with an attachment means that is complementary to said main-housing attachment means, said container being connected to said main housing.

15. The system of claim 14 wherein said dip tube and said base divider wall are a single unitary component of said device.

16. The system of claim 15 wherein said enclosed walls of said metered dosage reservoir include a top wall and said reservoir outlet is located on said top wall.

17. The system of claim 16 wherein in said top wall is a domed top wall.

18. The system of claim 15 wherein in said valve is connected to a flexible spring member such that said valve is movably connected to said outlet.

19. The system of claim 18 wherein said flexible spring member is connected to said top wall of said reservoir so as to move relative thereto.

20. The system of claim 18 wherein said flexible spring member includes a plurality of orifices thereon positioned for dispensing and dispersing of liquid exiting said reservoir outlet.

* * * * *